(12) United States Patent
Ortega Pena et al.

(10) Patent No.: US 12,044,810 B2
(45) Date of Patent: Jul. 23, 2024

(54) ON-DEVICE USER PRESENCE DETECTION USING LOW POWER ACOUSTICS IN THE PRESENCE OF MULTI-PATH SOUND PROPAGATION

(71) Applicant: Samsung Electronics Co., Ltd., Suwon-si (KR)

(72) Inventors: Andres Leonardo de Jesus Ortega Pena, San Jose, CA (US); Ashwin Chandra, Santa Clara, CA (US); David Ho Suk Chung, Rancho Palos Verdes, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/563,808

(22) Filed: Dec. 28, 2021

(65) Prior Publication Data

US 2023/0204744 A1    Jun. 29, 2023

(51) Int. Cl.
G01S 7/527    (2006.01)
G01S 7/539    (2006.01)

(52) U.S. Cl.
CPC ............ G01S 7/5273 (2013.01); G01S 7/539 (2013.01)

(58) Field of Classification Search
CPC ................ G01S 7/5273; G01S 7/539
See application file for complete search history.

(56) References Cited

U.S. PATENT DOCUMENTS

| | | | |
|---|---|---|---|
| 9,319,633 B1 | 4/2016 | Birkenes et al. | |
| 9,733,720 B2 * | 8/2017 | Kavli | G06F 1/3215 |
| 10,126,406 B2 * | 11/2018 | Altman | G01S 15/523 |
| 10,310,079 B1 | 6/2019 | Um et al. | |
| 10,795,018 B1 | 10/2020 | Koteshwara | |
| 10,824,921 B2 | 11/2020 | Bathiche et al. | |
| 10,928,917 B2 | 2/2021 | Jain et al. | |
| 10,959,018 B1 * | 3/2021 | Shi | G06N 20/00 |
| 11,402,499 B1 * | 8/2022 | Kamath Koteshwara | G01S 7/539 |
| 11,513,216 B1 * | 11/2022 | Kamath Koteshwara | G01S 7/52004 |
| 11,592,423 B2 | 2/2023 | Munemoto et al. | |
| 2013/0301391 A1 | 11/2013 | Altman et al. | |
| 2015/0036848 A1 | 2/2015 | Donaldson | |
| 2016/0345113 A1 | 11/2016 | Lee et al. | |
| 2018/0113212 A1 | 4/2018 | Tachibana et al. | |
| 2019/0187261 A1 * | 6/2019 | Peso Parada | G10K 9/12 |
| 2020/0201968 A1 | 6/2020 | Danielsen et al. | |

(Continued)

OTHER PUBLICATIONS

Schott et al. ("Asynchronous Chirp Slope Keying for Underwater Communication", Sensors 21.9 (2021): 3282) (Year: 2021).*

(Continued)

*Primary Examiner* — Yuqing Xiao
*Assistant Examiner* — Christopher Richard Walker
(74) *Attorney, Agent, or Firm* — Sherman IP LLP; Kenneth L. Sherman; Steven Laut

(57) ABSTRACT

One embodiment provides a method comprising acquiring, via one or more microphones of a device in a spatial area, a signal representing at least one echo of an ultrasound emitted via one or more loudspeakers of the device. The method further comprises applying digital signal processing to the signal to determine a signal-to-noise ratio (SNR) of the signal, and estimating one or more properties of a moving reflector in the spatial area based on the SNR of the signal.

20 Claims, 13 Drawing Sheets

(56) References Cited

U.S. PATENT DOCUMENTS

2021/0010855 A1    1/2021   Kondo et al.
2021/0072378 A1    3/2021   Shin et al.
2021/0239831 A1*   8/2021   Shin ........................ G01S 15/42

OTHER PUBLICATIONS

Gupta, S et al., "SoundWave: Using the Doppler Effect to Sense Gestures", 2012, pp. 1-4, downloaded Dec. 22, 2021: https://www.microsoft.com/en-us/research/wp-content/uploads/2016/11/GuptaSoundWaveCHI2012.pdf, ACM, United States.
Google, "Nest Hub Max," downloaded Dec. 22, 2021, https://store.google.com/us/product/google_nest_hub_max?hl=en-US, Oct. 2018, pp. 1-15, Google Store.
International Search Report and Written Opinion dated Apr. 4, 2023 for International Application PCT/PCT/KR2022/021408, from Korean Intellectual Property Office, pp. 1-12, Republic of Korea.

* cited by examiner

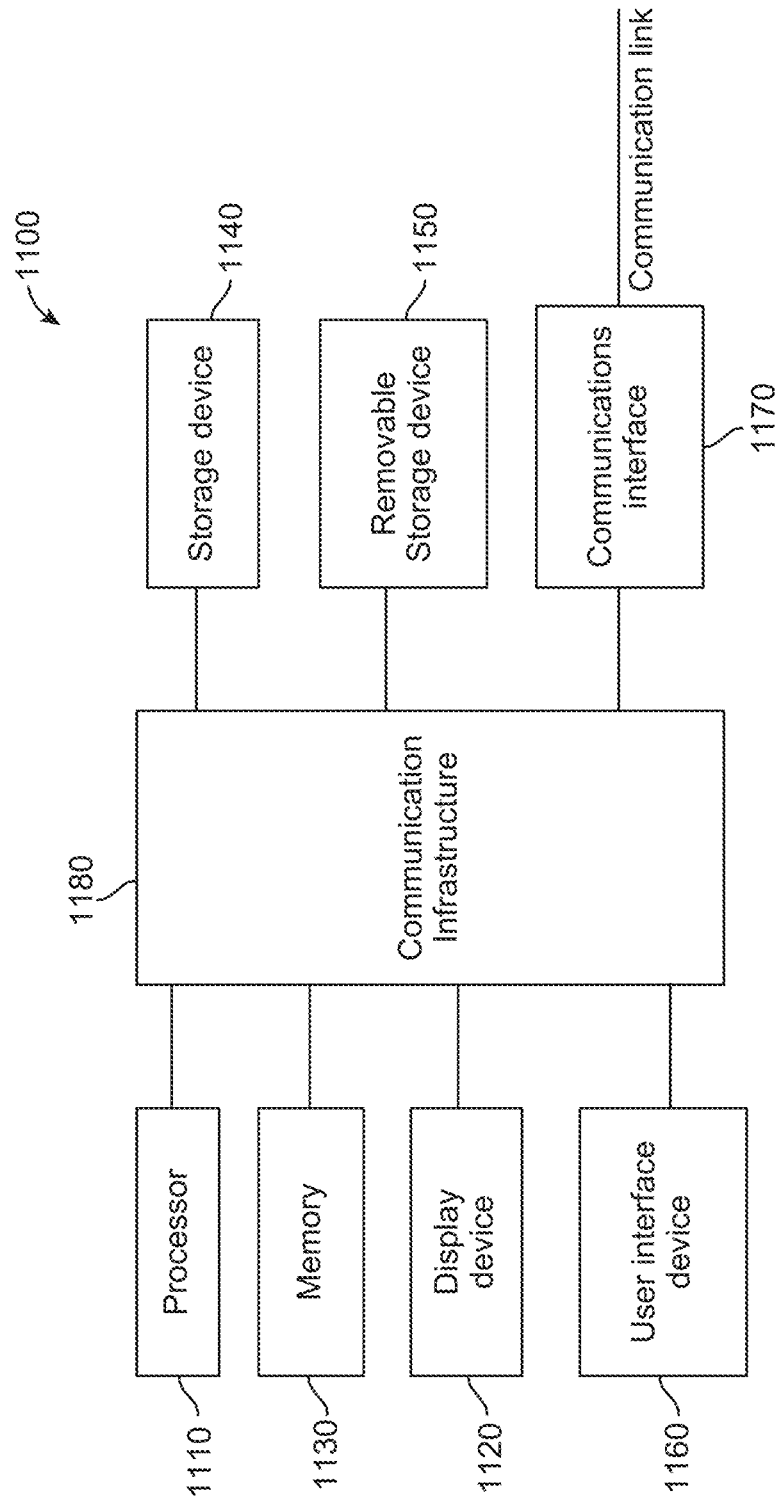

ON-DEVICE USER PRESENCE DETECTION USING LOW POWER ACOUSTICS IN THE PRESENCE OF MULTI-PATH SOUND PROPAGATION

TECHNICAL FIELD

One or more embodiments generally relate to user presence detection systems, in particular, a method and system of on-device user presence detection using low power acoustics in multi-path sound propagation environments.

BACKGROUND

Virtual sensing is a cost-effective way to recognize human activity (i.e., user activity). Virtual sensing facilitates user awareness, allowing a smart device (e.g., a smart phone, a smart television (TVs), etc.) to become aware of user presence and a performed user activity, and adjust a behavior (e.g., operational mode) of the smart device based on the performed user activity. Virtual sensing facilitates creation of activity-aware software applications that are loaded onto or downloaded to smart devices. For example, on a smart device, user activity can be inferred from traces of user movements and user position relative to the smart device. Some existing smart devices, however, do not have computational hardware suitable for sensing user presence.

SUMMARY

One embodiment provides a method comprising acquiring, via one or more microphones of a device in a spatial area, a signal representing at least one echo of an ultrasound emitted via one or more loudspeakers of the device. The method further comprises applying digital signal processing to the signal to determine a signal-to-noise ratio (SNR) of the signal, and estimating one or more properties of a moving reflector in the spatial area based on the SNR of the signal.

Another embodiment provides a system comprising at least one processor, and a non-transitory processor-readable memory device storing instructions that when executed by the at least one processor causes the at least one processor to perform operations. The operations include acquiring, via one or more microphones of a device in a spatial area, a signal representing at least one echo of an ultrasound emitted via one or more loudspeakers of the device. The operations further include applying digital signal processing to the signal to determine a signal-to-noise ratio (SNR) of the signal, and estimating one or more properties of a moving reflector in the spatial area based on the SNR of the signal.

One embodiment provides a non-transitory processor-readable medium that includes a program that when executed by a processor performs a method. The method comprises acquiring, via one or more microphones of a device in a spatial area, a signal representing at least one echo of an ultrasound emitted via one or more loudspeakers of the device. The method further comprises applying digital signal processing to the signal to determine a signal-to-noise ratio (SNR) of the signal, and estimating one or more properties of a moving reflector in the spatial area based on the SNR of the signal.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which:

FIG. 12 is a high-level block diagram showing an information processing system comprising a computer system useful for implementing the disclosed embodiments.

DETAILED DESCRIPTION

Figure 1:
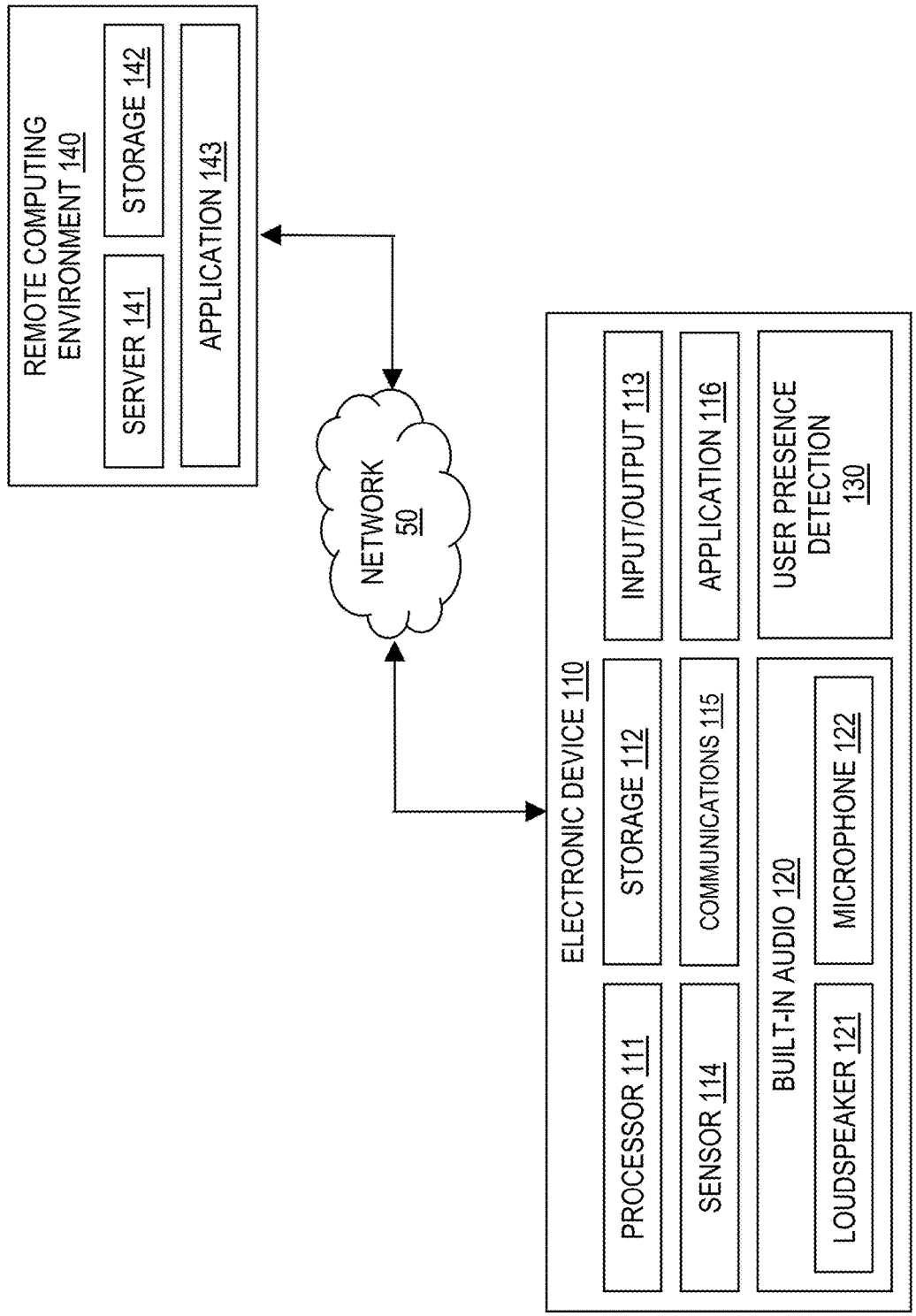
FIG. 1 is an example computing architecture for implementing on-device user presence detection, in one or more embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments generally relate to user presence detection systems, in particular, a method and system of on-device user presence detection using low power acoustics in multi-path sound propagation environments. One embodiment provides a method comprising acquiring, via one or more microphones of a device in a spatial area, a signal representing at least one echo of an ultrasound emitted via one or more loudspeakers of the device. The method further comprises applying digital signal processing to the signal to determine a signal-to-noise ratio (SNR) of the signal, and estimating one or more properties of a moving reflector in the spatial area based on the SNR of the signal.

Another embodiment provides a system comprising at least one processor, and a non-transitory processor-readable memory device storing instructions that when executed by the at least one processor causes the at least one processor to perform operations. The operations include acquiring, via one or more microphones of a device in a spatial area, a signal representing at least one echo of an ultrasound emitted via one or more loudspeakers of the device. The operations further include applying digital signal processing to the signal to determine a signal-to-noise ratio (SNR) of the signal, and estimating one or more properties of a moving reflector in the spatial area based on the SNR of the signal.

One embodiment provides a non-transitory processor-readable medium that includes a program that when executed by a processor performs a method. The method comprises acquiring, via one or more microphones of a device in a spatial area, a signal representing at least one echo of an ultrasound emitted via one or more loudspeakers of the device. The method further comprises applying digital signal processing to the signal to determine a signal-to-noise ratio (SNR) of the signal, and estimating one or more properties of a moving reflector in the spatial area based on the SNR of the signal.

Radio detection and ranging (radar) is a detection system that uses radio waves to determine the distance (range), angle, or velocity of objects.

Conventional ultrasonic proximity and distance ranging techniques require ultrasound reproduced by loudspeakers to be directed at a subject of interest (e.g., moving reflectors such as a human user), such that the optimal direction of the loudspeakers is pointing to the subject of interest. Loudspeakers of a smart device, however, are not always pointing to the optimal direction. As such, the ultrasound will take a line-of-sight (LOS) trajectory before bouncing off the subject of interest. The ultrasound follows a multi-path propagation and bounces off multiple standing reflectors (i.e., non-moving reflectors such as furniture, walls, etc.) before bouncing off a moving reflector (e.g., the subject of interest). Echoes/reflections of the ultrasound will also follow a LOS trajectory before reaching one or more built-in microphones of the device.

For example, in a conventional smart television (TV) with speakers, sound reproduced by the speakers is emitted to the rear of the smart TV, the sides of the smart TV, or downwards from the smart TV. As sound propagates along multiple paths before reaching a subject of interest and echoes of the sound are received at the smart device from all directions and interfere with one another, it is extremely difficult to extract information relating to movement of the subject of interest, such as distance of the subject of interest and direction of the movement, from the echoes.

One or more embodiments provide a method and system for detecting a moving reflector (e.g., a moving object such as a human user, an animal, etc.) in a spatial area (e.g., a room), and predicting a reflector type of the moving reflector (e.g., a type of moving object, such as human user, animal, or another type of moving object) based on ultrasonic echolocation utilizing one or more loudspeakers and one or more microphones integrated in, our coupled to, a device (e.g., smart device).

In one embodiment, an ultrasound is emitted via the one or more loudspeakers. The emitted ultrasound follows a multi-path sound propagation and bounces off multiple standing reflectors before bouncing off a moving reflector. Echoes from an emitted ultrasound are acquired via the one or more microphones, and used to estimate a distance of the moving reflector relative to the device and a direction of movement of the moving reflector relative to the device.

In one embodiment, the device includes multiple microphones (e.g., a microphone array) and multiple loudspeakers. In addition to the estimated distance and the estimated direction of movement, a position of the moving reflector relative to the device in a two-dimensional plane is estimated by computing, for each of the multiple microphones, a relative delay of detection of the moving reflector.

In one embodiment, after digital signal processing (DSP) is applied to the echoes, SNR samples of a detection signal resulting from the DSP are used to produce a features vector. The features vector is annotated/labeled and used to train a machine learning (ML) model configured to classify the reflector type of the moving reflector according to its unique echo footprint (i.e., signature). The resulting trained ML model is optimized/tuned and deployed for on-device processing to estimate/predict a reflector type of a moving reflector present in the spatial area (e.g., an animal vs. a human user).

FIG. 1 is an example computing architecture 100 for implementing on-device user presence detection, in one or more embodiments. The computing architecture 100 comprises an electronic device 110 including computing resources, such as one or more processor units 111 and one or more storage units 112. One or more applications may execute/operate on the electronic device 110 utilizing the computing resources of the electronic device 110.

Examples of an electronic device 110 include, but are not limited to, a television (TV), a smart appliance (e.g., a smart TV, etc.), a mobile electronic device (e.g., a smart phone, a laptop, a tablet, etc.), a gaming console, a video camera, a media playback device (e.g., a DVD player), a set-top box, an Internet of Things (IoT) device, a cable box, a satellite receiver, etc.

In one embodiment, the electronic device 110 comprises one or more sensor units 114 integrated in or coupled to the electronic device 110. The one or more sensor units 114 include one or more built-in microphones 122 configured to capture sound. The electronic device 110 may include one or more other sensor units 114 such as, but not limited to, a camera, a GPS, a motion sensor, etc.

In one embodiment, the electronic device 110 comprises one or more input/output (I/O) units 113 integrated in or coupled to the electronic device 110. In one embodiment, the one or more I/O units 113 include one or more built-in loudspeakers 121 configured to reproduce audio/sounds. The electronic device 110 may include one or more other I/O units 113 such as, but not limited to, a physical user interface (PUI) and/or a graphical user interface (GUI), such as a keyboard, a keypad, a touch interface, a touch screen, a knob, a button, a display screen, etc. In one embodiment, a user can utilize at least one I/O unit 113 to configure one or more user preferences, configure one or more parameters, provide user input, etc.

In one embodiment, a built-in audio system 120 of the electronic device 100 includes at least one loudspeaker 121 and at least one microphone 122 of the electronic device 110. Each microphone 122 of the built-in audio system provides an audio channel.

In one embodiment, the one or more applications on the electronic device 110 include a user presence detection system 130 that provides on-device user presence detection utilizing the built-in audio system of the electronic device 110. The user presence detection system 130 detects a moving reflector (e.g., a human user) in a spatial area that includes the electronic device 110 based on ultrasonic echolocation. The spatial area is within a room or other space where the moving reflector is positioned during audio reproduction (via the at least one loudspeaker 121). Specifically, the user presence detection system 130 is configured to: (1) generate an ultrasound, (2) emit the ultrasound via at least one loudspeaker 121, (3) capture one or more echoes of the ultrasound via at least one microphone 122, and (4) based on the echoes, detect the moving reflector in the spatial area and predict a reflector type of the moving reflector.

For example, in one embodiment, the built-in audio system of the electronic device 110 includes only one loudspeaker 121 and only one microphone 122 that provides a single audio channel the user presence detection system 130 utilizes for user presence detection ("single audio channel detector"). As another example, in one embodiment, the built-in audio system of the electronic device 110 includes multiple microphones 122 that provide multiple audio channels the user presence detection system 130 utilizes for user presence detection ("multiple audio channels detector").

In one embodiment, the one or more applications on the electronic device 110 may further include one or more software mobile applications 116 loaded onto or downloaded to the electronic device 110, such as an audio streaming application, a video streaming application, etc. A software mobile application 116 on the electronic device 110 may exchange data with the user presence detection system 130.

In one embodiment, the electronic device 110 comprises a communications unit 115 configured to exchange data with a remote computing environment, such as a remote computing environment 140 over a communications network/connection 50 (e.g., a wireless connection such as a Wi-Fi connection or a cellular data connection, a wired connection, or a combination of the two). The communications unit 115 may comprise any suitable communications circuitry operative to connect to a communications network and to exchange communications operations and media between the electronic device 110 and other devices connected to the same communications network 50. The communications unit 115 may be operative to interface with a communications network using any suitable communications protocol such as, for example, Wi-Fi (e.g., an IEEE 802.11 protocol), Bluetooth®, high frequency systems (e.g., 900 MHz, 2.4 GHz, and 5.6 GHz communication systems), infrared, GSM, GSM plus EDGE, CDMA, quadband, and other cellular protocols, VOIP, TCP-IP, or any other suitable protocol.

In one embodiment, the remote computing environment 140 includes computing resources, such as one or more servers 141 and one or more storage units 142. One or more applications 143 that provide higher-level services may execute/operate on the remote computing environment 140 utilizing the computing resources of the remote computing environment 140.

In one embodiment, the remote computing environment 140 provides an online platform for hosting one or more online services (e.g., an audio streaming service, a video streaming service, etc.) and/or distributing one or more applications. For example, the user presence detection system 130 may be loaded onto or downloaded to the electronic device 110 from the remote computing environment 140 that maintains and distributes updates for the system 130. As another example, a remote computing environment 140 may comprise a cloud computing environment providing shared pools of configurable computing system resources and higher-level services.

In one embodiment, the user presence detection system 130 is integrated into, or implemented as part of, a smart TV or another smart device.

In one example application use, if content is being played on a display screen of the electronic device 110 and people leave the spatial area (e.g., room), the user presence detection system 130 is configured to report that moving reflectors (i.e., the people) are moving away, such that once all the moving reflectors are gone, playback of the content pauses, the display screen is turned off, or the electronic device 110 enters into low power mode. The playback of the content will resume when someone enters the spatial area (e.g., approaches the electronic device 110).

In another example application use, when someone enters the spatial area, the user presence detection system 130 is configured to report that moving a reflector (i.e., a human user) is approaching the electronic device 110, such that the electronic device 110 turns on the display screen or enables voice interaction without a wake word.

In another example application use, the display screen adaptively changes its UI display (e.g., UI layout, UI font size, etc.) based on the content and distance between a human user and the display screen (i.e., progressive adaptive UI display). For example, the font size may be bigger if the human user is further away from the display screen, and the font size may be smaller if the human user is closer to the display screen.

In one embodiment, the user presence detection system 130 is used to complement automatic content recognition (ACR) to add extra information about audience presence (i.e., presence of human user).

In one embodiment, the user presence detection system 130 is used as part of a surveillance system that can report about intrusions into the spatial area (e.g., room intrusions).

Figure 2:
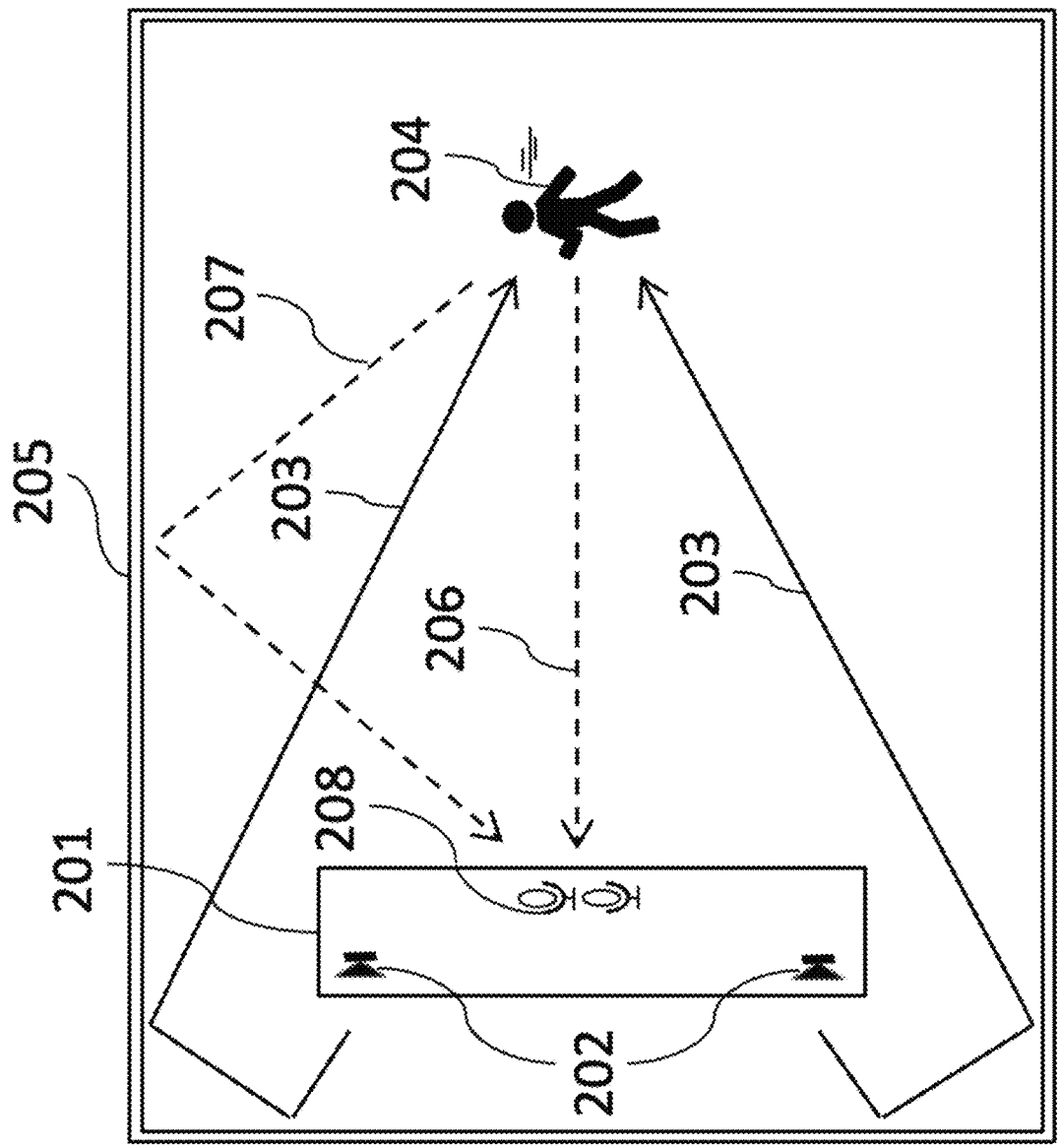
FIG. 2 illustrates an example use of on-device user presence detection, in one or more embodiments.

FIG. 2 illustrates an example use of on-device user presence detection, in one or more embodiments. In one embodiment, the electronic device 110 in FIG. 1 is implemented as a smart device (e.g., a smart TV) 201. The smart device 201 includes one or more loudspeakers 202 and one or more microphones 208. In one embodiment, the user presence detection system 130 triggers the one or more loudspeakers 202 to emit an ultrasound in a spatial area (e.g., a room or other space including the smart device 201). As shown in FIG. 2, the ultrasound propagates in arbitrary trajectories 203 that are altered by the presence of reflectors in the spatial area. The reflectors may include one or more standing reflectors 205 such as, but not limited to, walls, furniture, etc.

The reflectors may include one or more moving reflectors 204 such as, but not limited to, a human user. Each moving reflector represents a reflector of interest (i.e., subject of interest). When the ultrasound bounces off a moving reflector 204, echoes of the ultrasound follow one or more multi-path trajectories 207 and an optimal line-of-sight (LOS) trajectory 206 before reaching the one or more microphones 208 of the smart device 201. The user presence detection system 130 applies DSP to mix all of the trajectories 206, 207 constructively, destructively, or a combination of both. The DSP may introduce amplitude attenuation and selective frequency fading.

Figure 3A:
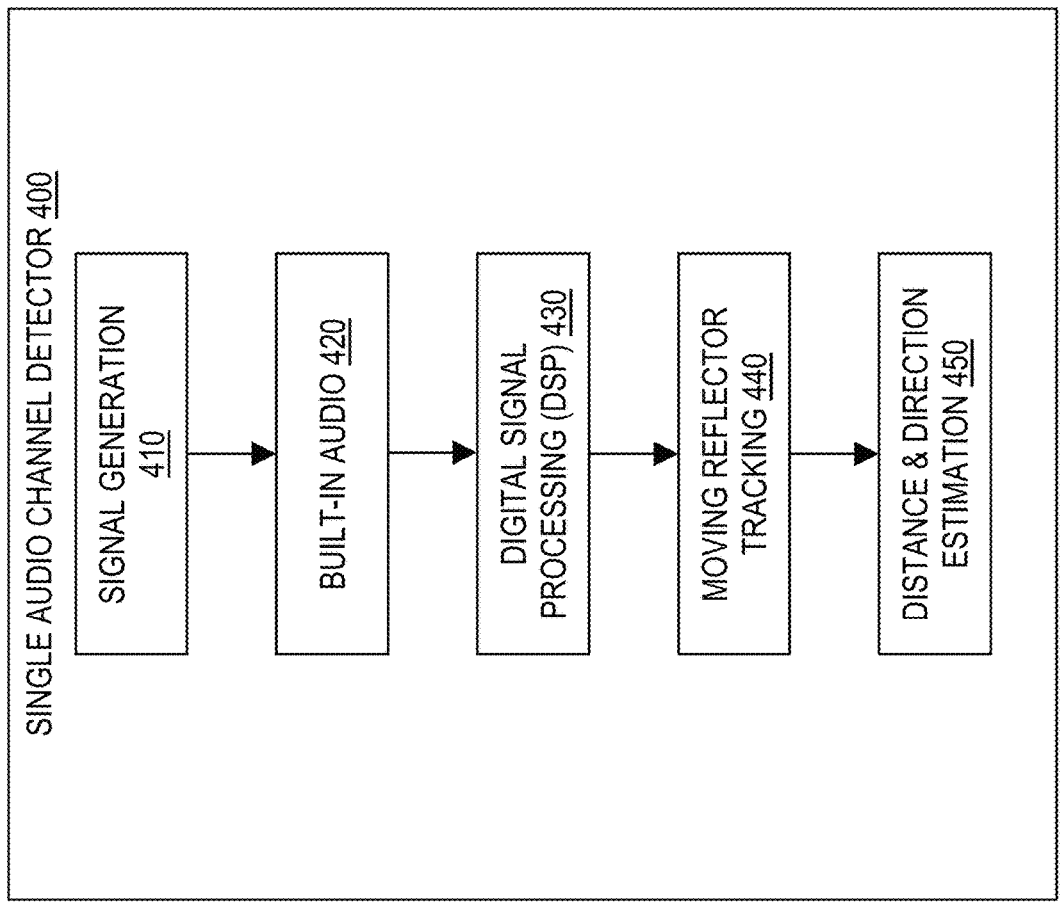
FIG. 3A illustrates an example on-device user presence detection system, in one or more embodiments.

FIG. 3A illustrates an example on-device user presence detection system 400, in one or more embodiments. In one embodiment, the user presence detection system 130 in FIG. 1 is implemented as the user presence detection system 400. In one embodiment, the user presence detection system 400 comprises a signal generation system 410 configured to generate an ultrasonic chirp.

In one embodiment, the user presence detection system 400 comprises a built-in audio system 420 including a single built-in loudspeaker 422 (FIG. 3B) and a single built-in microphone 423 (FIG. 3B) that provides a single audio channel. Utilizing the single audio channel, the user presence detection system 400 operates as a single audio channel detector for user presence. In one embodiment, the user presence detection system 400 initiates an iteration of an iterative loop/process that includes: (1) via the loudspeaker 422, emitting in a spatial area an ultrasonic chirp generated by the signal generation system 410, and (2) via the microphone 423, capturing and digitalizing echoes/reflections of the chirp.

In one embodiment, the user presence detection system 400 comprises a DSP system 430. The iteration of the iterative loop/process further includes applying, via the DSP system 430, DSP to the echoes/reflections captured and digitalized by the built-in-audio system 420, resulting in a detection signal.

In one embodiment, the user presence detection system 400 comprises a moving reflector tracking system 440. The iteration of the iterative loop/process further includes tracking, via the moving reflector tracking system 440, one or more moving reflectors in the spatial area by applying a tracking algorithm to the detection signal from the DSP system 430.

In one embodiment, the user presence detection system 400 comprises a distance and direction estimation system 450. The iteration of the iterative loop/process further includes: (1) estimating, via the distance and direction estimation system 450, a position or distance of the one or more moving reflectors (tracked by the moving reflector tracking system 440) relative to the electronic device 110, (2) estimating, via the distance and direction estimation system 450, a direction of movement of the one or more moving reflectors relative to the electronic device 110, and (3) reporting, via the distance and direction estimation system 450, results including the estimated position or distance and the estimated direction to an application executing/operating on the electronic device 110 (e.g., a client application using presence/proximity estimation). Based on input received from the application that the results are reported to, the user presence detection system 400 may perform another iteration of the iterative loop/process or stop the iterative loop/process.

Figure 3B:
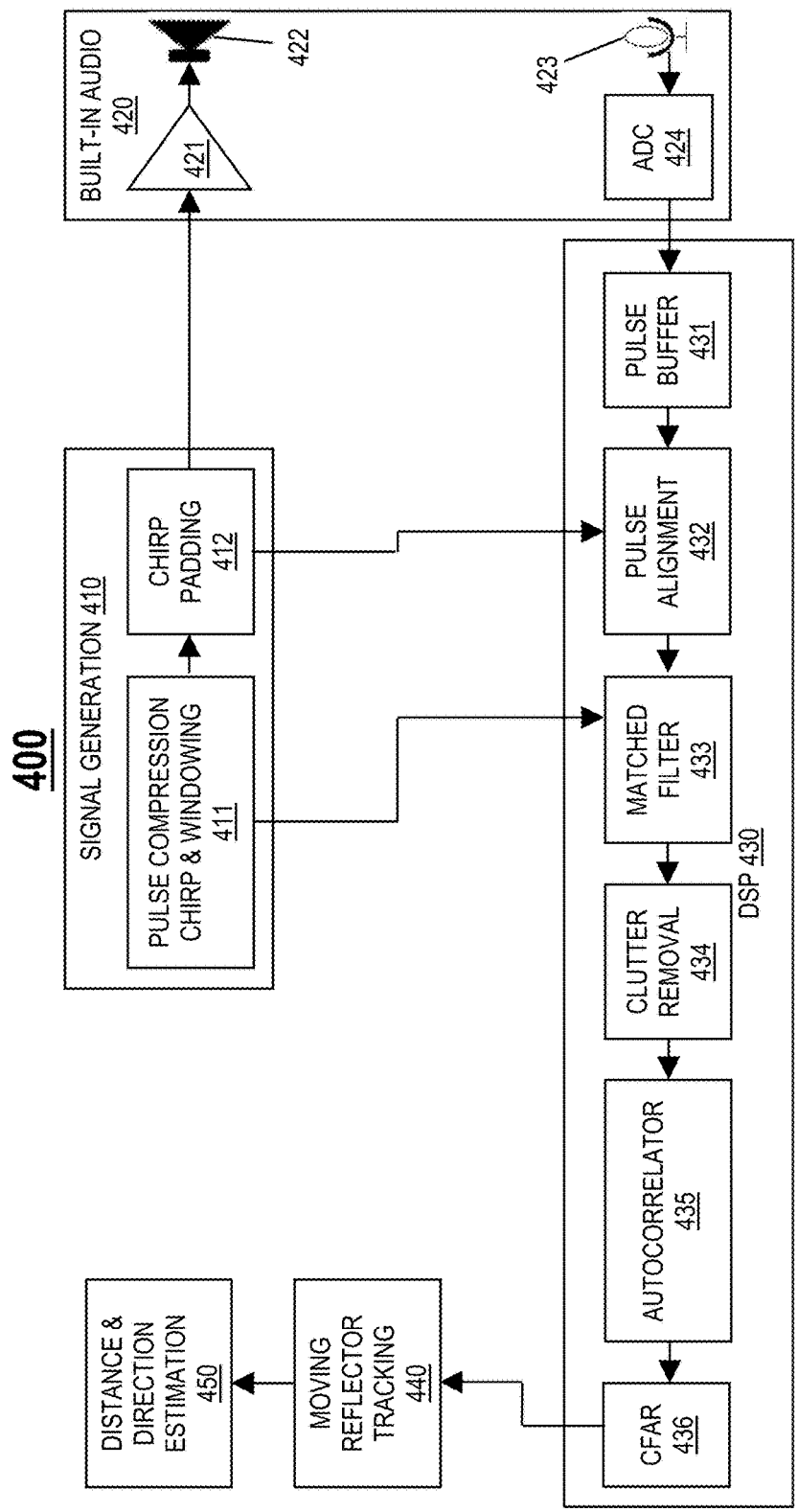
FIG. 3B illustrates the on-device user presence detection system in detail, in one or more embodiments.

FIG. 3B illustrates the on-device user presence detection system 400 in detail, in one or more embodiments. In one embodiment, the signal generation system 410 comprises a pulse compression chirp and windowing unit 411 configured to: (1) generate/synthesize a chirp by linearly increasing a frequency sweep from a chirp start frequency F0 to a chirp stop frequency F1, wherein the duration of the chirp is set based on a pulse repetition frequency PRF and a pulse duty cycle DUTYCYLE, and (2) multiply the duration of the chirp by a window function (e.g., Hann window), resulting in a windowed chirp (i.e., windowed wave).

In one embodiment, the signal generation system 410 comprises a chirp padding unit 412 configured to: (1) receive a windowed chirp (e.g., from the pulse compression chirp and windowing unit 411), and (2) zero pad the windowed chirp to complete a time period defined by PRF (i.e., 1−DUTYCYCLE/PRF).

In one embodiment, the built-in audio system 420 comprises a digital-to-analog converter (DAC) and amplifier system 421 configured to: (1) receive a digital ultrasound signal comprising a windowed chirp (e.g., from the signal generation system 410), (2) convert the digital ultrasound signal to an analog ultrasound signal utilizing a DAC, (3) amplify the analog ultrasound signal utilizing an amplifier, and (4) provide the amplified analog ultrasound signal to the single built-in loudspeaker 422 for reproduction.

The built-in loudspeaker 422 emits/plays the chirp, the chirp propagates in a spatial area including the electronic device 110 (FIG. 1), and the single built-in microphone 423 captures analog signals of echoes/reflections of the chirp.

In one embodiment, the built-in audio system 420 comprises an analog-to-digital converter (ADC) 424 configured to: (1) receive analog signals of echoes/reflections captured by the built-in microphone 423, (2) digitalize echoes/reflections by converting the analog signals to digital signals, and (3) provide the digital signals (e.g., to a callback function) as pulse responses for DSP.

In one embodiment, audio I/O and high-level API calls for writing and reading audio run in an acquisition thread.

In one embodiment, a built-in loudspeaker 121 in FIG. 1 is implemented as the built-in loudspeaker 422, and a built-in microphone 122 in FIG. 1 is implemented as the built-in microphone 423.

In one embodiment, the DSP system 430 comprises a pulse input buffer 431 configured to: (1) receive a new pulse response (e.g., from the built-in-audio system 420), and (2) maintain a pre-determined number L of pulse responses including the new pulse response. In one embodiment, a length of the buffer 431 is equal to L*pulse_length, wherein pulse_length is a length of a pulse response in samples. In one embodiment, the buffer 431 maintains the last L pulse responses received. In response to receiving a new pulse response, the oldest pulse response maintained in the buffer 431 is disposed to make room for maintaining the new pulse response in the buffer 431. For example, if L=8, the buffer 431 maintains the last eight pulse responses received.

In one embodiment, the DSP system 430 comprises a pulse alignment unit 432 configured to align a digital signal by determining a delay d relative to the strongest echo/reflection (i.e., first to arrive from the loudspeaker 422) captured by the built-in microphone 423. Specifically, the pulse alignment unit 432 determines a full cross-correlation c between the oldest pulse response maintained in the buffer 431 and a windowed chip (e.g., from the chirp padding unit 412), and determines the delay d in accordance with equation (1) provided below:

$$d = \arg_{max}(c) - \frac{\text{length}(c)}{2}, \quad (1)$$

wherein the delay d is in samples, $\arg_{max}$ is a function that returns an index of a maximum value of the cross-correlation c, and length is a function that returns a length of the cross-correlation c.

The pulse alignment unit 432 obtains a subarray of pulse responses from the buffer 431 based on the delay d. In one embodiment, the subarray comprises (L−1) pulse responses. The subarray starts at a position of the buffer 431 that is equal to d, and a length of the subarray is equal to (L−1)*pulse_length. The pulse alignment unit 432 filters the (L−1) pulse responses using a bandpass filter from F0−Fd to F1+Fd, wherein Fd is an allocated bandwidth for a delay equivalent to a doppler shift delay of the echoes/reflections captured by the built-in microphone 423. The pulse alignment unit 432 reshapes the (L−1) pulse responses filtered into a two-dimensional array, wherein the dimensions of the array is (L−1)×pulse_length.

The pulse alignment unit 432 is used to detect a delay equivalent to a doppler shift delay of the echoes/reflections (i.e., echo power) captured by the built-in microphone 423 (i.e., utilizes built-in hardware), thereby removing the need for specialized hardware such as a coherent/reference oscillator and a phase sensitive detector.

In one embodiment, the DSP system 430 comprises a matched filter system 433 configured to: (1) receive a two-dimensional array of (L−1) pulse responses from pulse alignment unit 432, and (2) for each of the (L−1) pulse responses, generate a complex (e.g., in-phase and in-quadrature) representation of echo strength of the pulse response as a function of time.

In one embodiment, the DSP system 430 comprises a clutter removal unit 434 configured to apply clutter removal echo envelopes to remove clutter from the echo envelopes, resulting in uncluttered echo envelopes. In one embodiment, the clutter removal is applied in a rolling-window fashion based on complex (e.g., in-phase and in-quadrature) representations of echo strength of (L−1) pulse responses received from the matched filter system 433. For example, in one embodiment, the clutter removal is applied in a rolling-window fashion in groups of three, in accordance with equation (2) provided below:

$$\text{unclutter\_echo} = \text{envelope}(0) - 2*\text{envelope}(t-1) + \text{envelope}(t-2) \quad (2),$$

wherein envelope(0) is a last echo envelope of a group of three echo envelopes, envelope(t−1) is a second to last echo envelope of the group, envelope(t−2) is a third to last echo envelope of the group, unclutter_echo is ranging vector of uncluttered echo envelopes, and a length of the ranging vector is L−3.

In one embodiment, the DSP system 430 comprises an autocorrelator system 435 configured to perform autocorrelation detection. As described in detail later herein, the autocorrelation detection involves an intercomparison between measurements acquired for the same reflector in the spatial area, and generating a detection signal having spikes that correspond to an interference produced by moving reflectors in the spatial area. Utilizing the autocorrelation detection enables proximity detection in multi-path sound propagation of an ultrasound, and distance range ranges from substantially about 6 m to 7 m (unlike convention techniques where distance range is limited to about 1 m).

In one embodiment, the DSP system 430 comprises a constant false alarm rate (CFAR) unit 436 configured to perform CFAR detection. In one embodiment, the CFAR detection includes determining a power threshold above which a detection signal can be determined to originate from a moving reflector instead of a standing reflector, wherein the detection signal is based on autocorrelation detection performed by the autocorrelator system 435. In one embodiment, the CFAR detection includes determining a noise threshold and raw noise strength, and determining a SNR of a detection signal and a set of detection candidates (i.e., potential moving reflectors) based on the noise threshold and raw noise strength. In one embodiment, a detection signal CFAR_input_signal is determined in accordance with equation (3) provided below:

$$\text{CFAR\_input\_signal} = \log_{10}(\text{Register\_1}^2 + \text{Register\_2}^2) \quad (3),$$

wherein Register_1 and Register_2 are results stored in Register 1 and Register 2 of the autocorrelator system 435 as a result of the autocorrelation detection.

In one embodiment, the DSP system 430 detects a moving reflector in the spatial area with high confidence if a SNR of a detection signal exceeds a pre-determined threshold (e.g., over 20 dB). If the DSP system 430 detects a moving reflector in the spatial area with high confidence, the DSP system 430 reports a distance of the moving reflector.

If the DSP system 430 does not detect a moving reflector in the spatial area with high confidence (e.g., detection is momentarily lost or a SNR of a detection signal does not exceed the pre-determined threshold (e.g., not over 20 dB)), the moving reflector tracking system 440 is utilized to track one or more moving reflectors in the spatial area.

In one embodiment, the moving reflector tracking system 440 is configured to track one or more moving reflectors in the spatial area by: (1) maintaining a record of historical datapoints indicative of one or more prior distance measurements, (2) predicting, using a Kalman filter, the one or more moving reflectors in the spatial area based on the historical datapoints, and (3) reporting the prediction for as many cycles as allowed by a pre-determined parameter indicative of time to live (TTL). If the TTL expires, the moving reflector tracking system 440 stops reporting the prediction. If the prediction is validated before the TTL expires, the moving reflector tracking system 440 resumes tracking of one or more moving reflectors in the spatial area using the Kalman filter with an updated record of historical datapoints including a new range bin of datapoints indicative of distance.

In one embodiment, for each moving reflector tracked by the moving reflector tracking system 440, the distance and direction estimation system 450 is configured to: (1) apply a smoothing operation to an array of range bins of datapoints to filter out rapid changes, (2) estimate a distance of the moving reflector and a direction of movement of the moving reflector based on the array, and (3) report the estimated distance and estimated direction to an application executing/operating on the electronic device 110 (e.g., a client application using presence/proximity estimation). In one embodiment, a last range bin of the array represents a current distance of the moving reflector.

In one embodiment, a distance of a moving reflector is estimated in accordance with equation (4) provided below:

$$\text{distance} = 100 * \frac{\text{speed of sound}}{2 * PRF} * \frac{\text{range\_bin}}{\text{decimation\_length}}, \quad (4)$$

wherein PRF is a pulse repetition frequency, range_bin is an index ∈ [0, decimation_length−1] of a strongest echo of the reflector, and decimation_length is a size of a ranging vector (i.e., vector of the range bins of the array). In one embodiment, a direction of movement of the moving reflector is estimated by estimating a slope sign of a direction between two datapoints of a range bin of the array.

Figure 4:
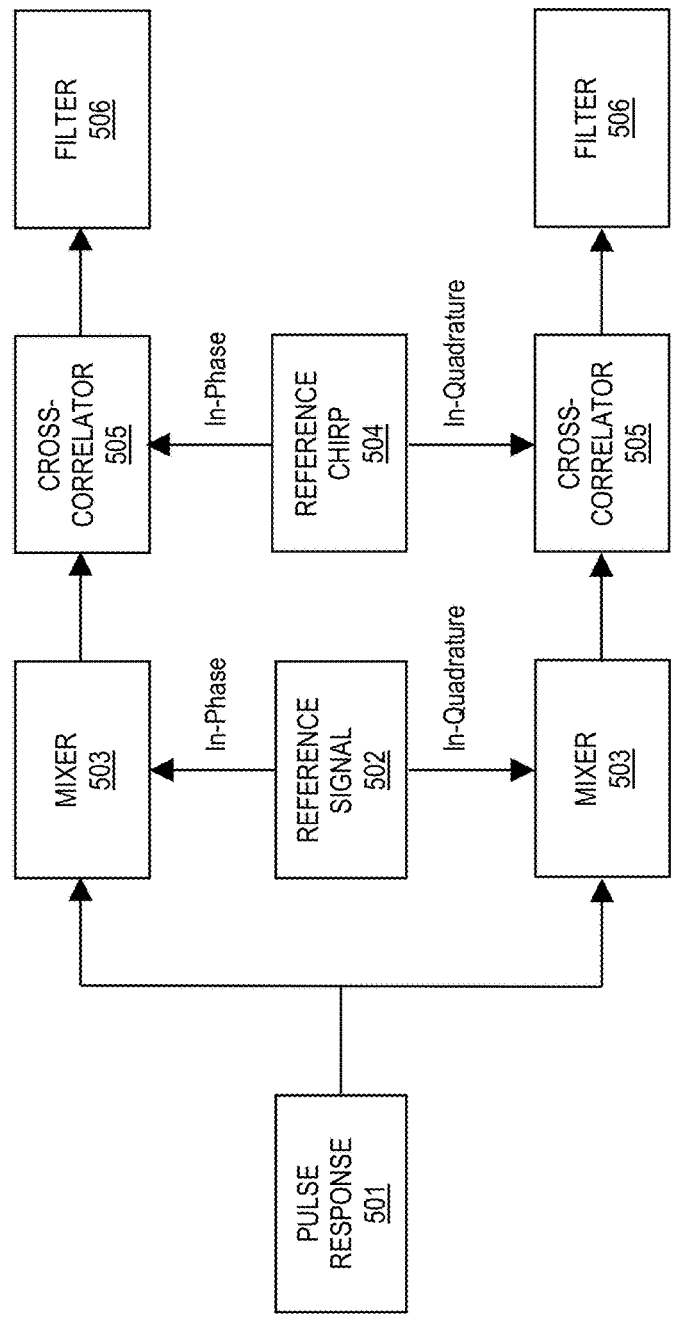
FIG. 4 illustrates an example matched filter system, in one or more embodiments.

FIG. 4 illustrates an example matched filter system 500, in one or more embodiments. In one embodiment, the matched filter system 433 in FIG. 3B is implemented as the matched filter system 500. In one embodiment, the matched filter system 500 comprises: (1) a pulse response unit 501 configured to provide a single pulse response (e.g., received from the pulse alignment unit 432), (2) a reference signal unit 502 configured to provide an in-phase and in-quadrature representation (i.e., complex representation) of a sinusoidal reference signal, (3) mixer units 503 configured to mix the single pulse response with the in-phase and in-quadrature representation of the sinusoidal reference signal to generate a complex baseband signal (e.g., a first mixer unit 503 and a second mixer unit 503 for in-phase and in-quadrature, respectively), (4) a reference chirp unit 504 configured to provide an in-phase and in-quadrature representation (i.e., complex representation) of a chirp reference signal, (5) cross-correlator units 505 configured to cross-correlate the complex baseband signal with the in-phase and in-quadrature representation of the chirp reference signal to generate a cross-correlated complex baseband signal (e.g., a first cross-correlator unit 505 and a second cross-correlator unit 505 for in-phase and in-quadrature, respectively), and (6) filter units 506 configured to filter the cross-correlated complex baseband signal to remove high frequency components (e.g., a first filter unit 506 and a second filter unit 506 for in-phase and in-quadrature, respectively), resulting in an echo envelope that is provided as output to the clutter removal unit 434. In radar, the echo envelope is a video signal.

Figure 5:
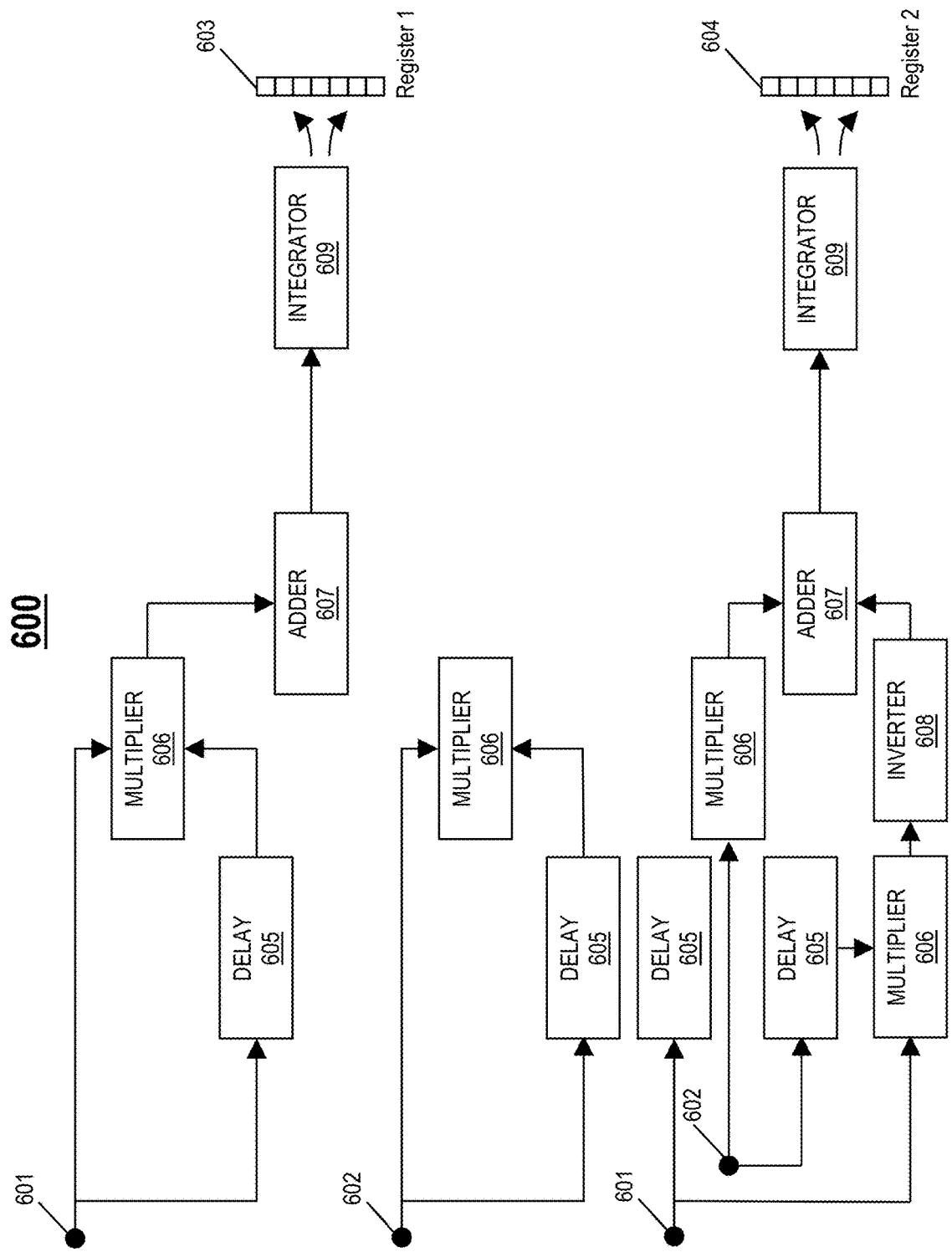
FIG. 5 illustrates an example autocorrelator system, in one or more embodiments.

FIG. 5 illustrates an example autocorrelator system 600, in one or more embodiments. In one embodiment, the autocorrelator system 435 in FIG. 3B is implemented as the autocorrelator system 600. In one embodiment, the autocorrelator system 600 processes concurrently echoes from multiple distances by manipulating two consecutive pulses. Manipulating two consecutive pulses involves the autocorrelator system 600 receiving, as inputs, in-phase components 601 and in-quadrature components 602 of two consecutive uncluttered echo envelopes (e.g., from the clutter removal unit 434), and segmenting the in-phase components 601 and the in-quadrature components 602 via range binning (i.e., ranging) which involves applying decimation to each echo envelope to reduce an array size of the echo envelope from pulse_length (i.e., a length of a pulse response in samples) to decimation_length (e.g., decimation_length=256).

In one embodiment, the autocorrelator system 600 comprises a plurality of delay units 605, a plurality of multiplier units 606, a plurality of adder units 607, an inverter 608, a plurality of integrator units 609, and a plurality of registers. In one embodiment, the registers include a first register 603 (Register 1) and a second register 604 (Register 2). Each delay unit 605 is configured to maintain a previous range bin at the same distance. Each multiplier unit 606 is configured to perform multiplication. Each adder unit 607 is configured to perform addition. Each integrator unit 609 is configured to perform integration. Each register 604 is configured to maintain results of autocorrelation detection using previous pulses.

Manipulating two consecutive pulses further involves the following process: for each range bin, the in-phase components 601 and the in-quadrature components 602 of the consecutive uncluttered echo envelopes are combined via the multiplier units 606, the inverter unit 608, and the adder units 607, and then summed via the integrator units 609 with the results maintained in the integrator units 609. The process is repeated for all available L−3 ranging vectors.

In ultrasonic imaging, results maintained in the registers (e.g., registers 603 and 604) are used to determine instant frequency and phase.

Figure 6:
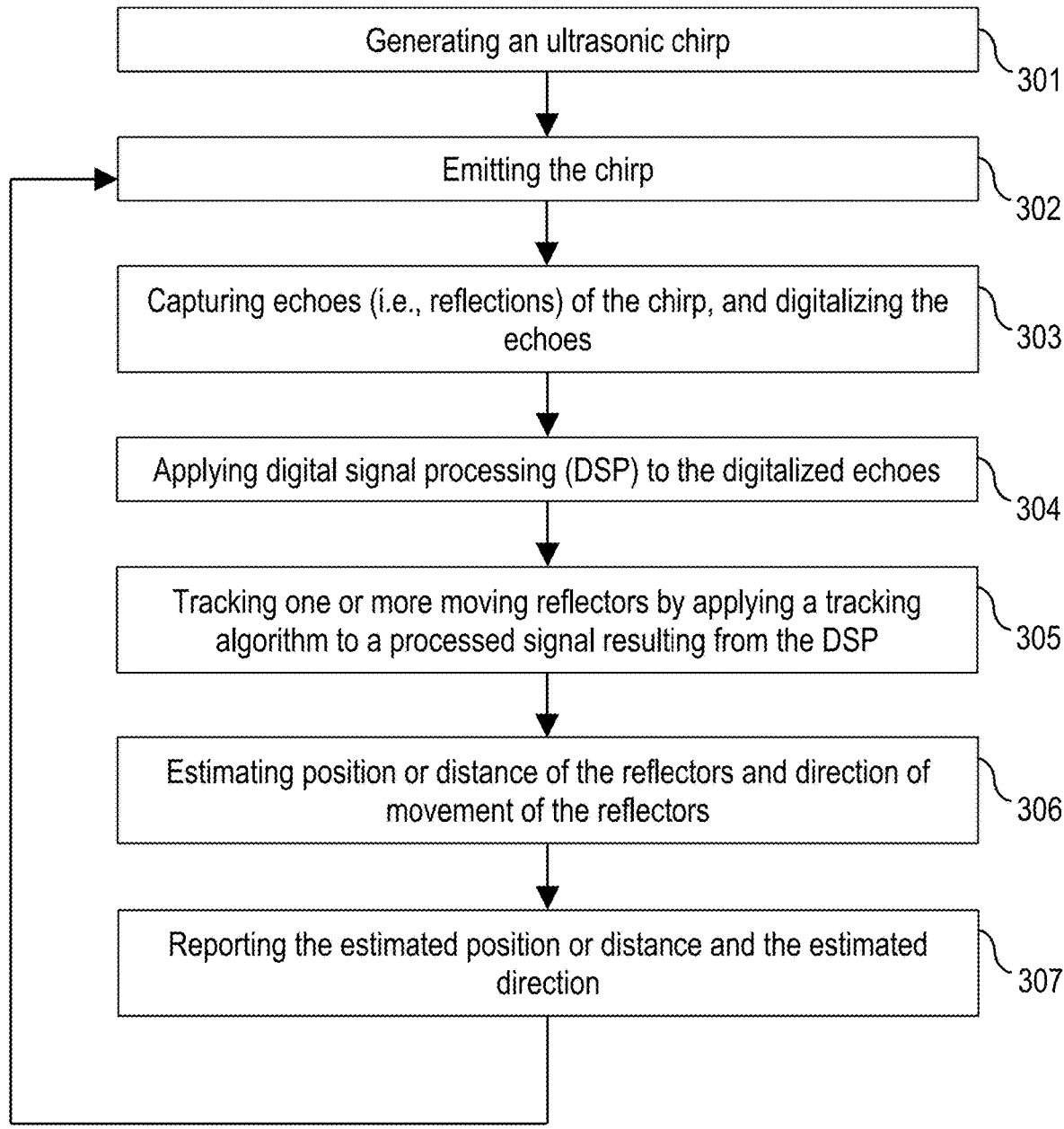
FIG. 6 is a flowchart of an example process for detecting user presence using a single audio channel detector, in one or more embodiments.

FIG. 6 is a flowchart of an example process 300 for detecting user presence using a single audio channel detector, in one or more embodiments. Process block 301 includes generating an ultrasonic chirp (e.g., via the signal generation system 410). Process block 302 includes initiating an iteration of an iterative loop by emitting the chirp (e.g., via the built-in-audio system 420). Process block 303 includes capturing echoes (i.e., reflections) of the chirp, and digitalizing the echoes (e.g., via the built-in-audio system 420). Process block 304 includes applying digital signal processing (DSP) to the digitalized echoes (e.g., via the DSP system 430). Process block 305 includes tracking one or more moving reflectors by applying a tracking algorithm to a processed signal (i.e., detection signal) resulting from the DSP (e.g., via the moving reflector tracking system 440). Process block 306 includes estimating position or distance of the reflectors and direction of movement of the reflectors (e.g., via the distance and direction estimation system 450). Process block 307 includes reporting the estimated position or distance and the estimated direction (e.g., via the distance and direction estimation system 450). After process block 307, the process 300 returns to process block 302 to initiate another iteration of the iterative loop.

In one embodiment, process blocks 301-307 may be performed by one or more components of the on-device user presence detection system 400.

A moving reflector has a unique echo footprint (i.e., signature) that affects a shape of its echo envelope (i.e., video signal). The unique echo footprint is identifiable in a SNR of a video signal as a function of range bin. An echogram of the video signal is an image produced out of consecutive SNR samples (e.g., if decimation_length is 256, SNR samples of 256 consecutive pulse responses produces a 256×256 image), and the image includes information indicative of a position or distance, a direction of movement, and a reflector type of a moving reflector.

Figure 7:
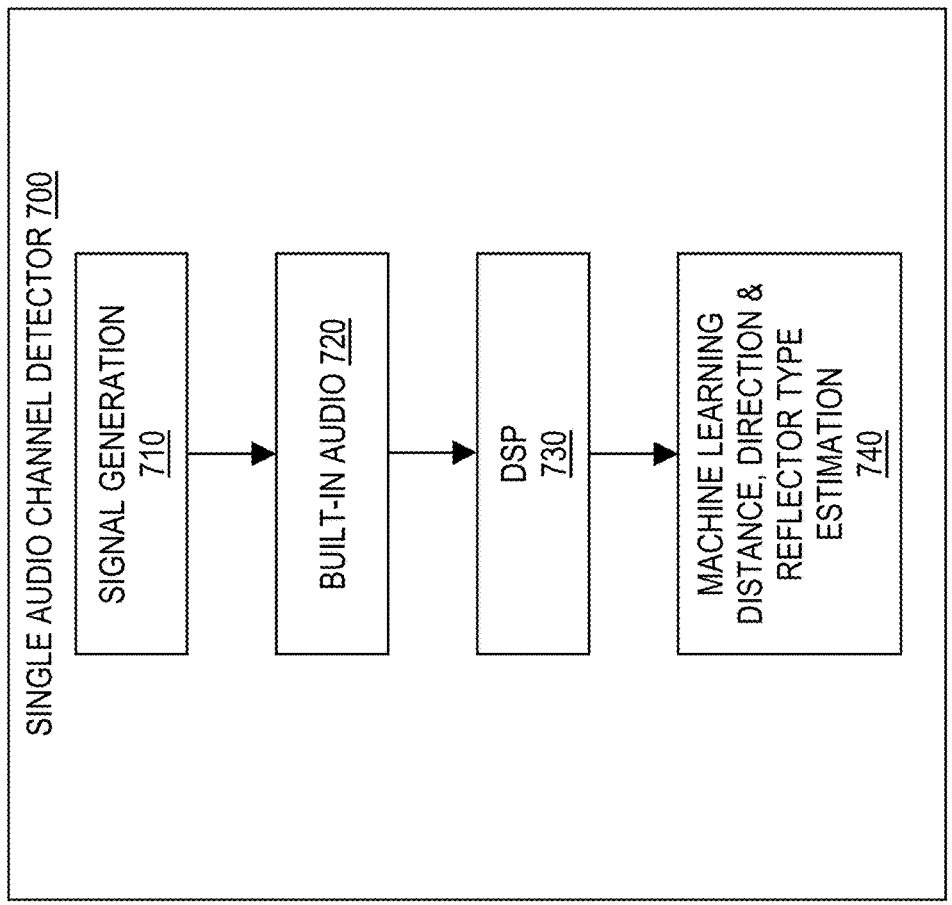
FIG. 7 illustrates another example on-device user presence detection system, in one or more embodiments.

FIG. 7 illustrates another example on-device user presence detection system 700, in one or more embodiments. In one embodiment, the user presence detection system 130 in FIG. 1 is implemented as the user presence detection system 700. In one embodiment, the user presence detection system 700 comprises a signal generation system 710 configured to generate an ultrasonic chirp.

In one embodiment, the user presence detection system 700 comprises a built-in audio system 720 including a single built-in loudspeaker (e.g., loudspeaker 422 of FIG. 3B) and a single built-in microphone (e.g., microphone 423 of FIG. 3B) that provides a single audio channel. In one embodiment, the user presence detection system 700 initiates an iteration of an iterative loop/process that includes: (1) via the loudspeaker of the built-in audio system 720, emitting in a spatial area an ultrasonic chirp generated by the signal generation system 710, and (2) via the microphone of the audio system 720, capturing and digitalizing echoes/reflections of the chirp.

In one embodiment, the user presence detection system 700 comprises a DSP system 730. The iteration of the iterative loop/process further includes applying, via the DSP system 730, DSP to the echoes/reflections captured and digitalized by the built-inaudio system 720, resulting in a detection signal.

In one embodiment, the user presence detection system 700 comprises a machine learning distance, direction, and reflector type estimation system 740. The iteration of the iterative loop/process further includes: (1) utilizing machine learning to estimate/predict, via the estimation system 740, a position or distance of one or more moving reflectors in the spatial area, a direction of movement of the one or more moving reflectors, and a reflector type of the one or more moving reflectors based on the detection signal from the DSP system 730, and (2) reporting, via the estimation system 740, results including the estimated position or distance, the estimated direction, and the estimated reflector type to an application executing/operating on the electronic device 110 (e.g., a client application using presence/proximity estimation). Based on input received from the application that the results are reported to, the user presence detection system 700 may perform another iteration of the iterative loop/process or stop the iterative loop/process.

In one embodiment, the estimation system 740 comprises at least one trained machine learning model. The at least one trained machine learning model is configured to receive a detection signal (e.g., from the DSP system 730) as an input, and estimate/predict a position or distance of one or more moving reflectors in the spatial area, a direction of movement of the one or more moving reflectors, and a reflector type of the one or more moving reflectors based on the detection signal. In one non-limiting example, the at least one trained machine learning model comprises a single machine learning model only. In another non-limiting example, the at least one trained machine learning model comprises: (1) a first trained machine learning model configured to estimate a position or distance of one or more moving reflectors in the spatial area, and a direction of movement of the one or more moving reflectors, and (2) a second trained machine learning model configured to estimate/predict a reflector type of the one or more moving reflectors.

Utilizing the single audio channel provided and the at least one trained machine learning model, the user presence detection system 700 operates as a machine learning single audio channel detector for user presence.

In one embodiment, each trained machine learning model of the estimation system 740 comprises a neural network. In one non-limiting example, each trained machine learning model of the estimation system 740 comprises a convolutional neuronal network. In another non-limiting example, each trained machine learning model of the estimation system 740 comprises another type of neuronal network.

In one embodiment, off-device (i.e., offline) processing includes obtaining training data and/or training and testing a machine learning model based on the training data. For example, in one embodiment, the one or more applications 143 (FIG. 1) executing/operating on the remote computing environment 140 includes a training system configured to perform the off-device processing.

In one embodiment, output of DSP (e.g., detection signals from the DSP system 730) is used to produce a set of two-dimensional matrices representing echograms of detection signals, and the set of matrices are annotated/labeled and normalized to obtain the training data. In a training phase, at least one machine learning model is trained using the training data. At least one trained machine learning model resulting from the training phase is loaded onto or downloaded to the electronic device 110. In a deployment phase, the at least one trained machine learning model is deployed for on-device (i.e., online) processing including estimating/predicting a position or distance of one or more moving reflectors in the spatial area, a direction of movement of the one or more moving reflectors, and a reflector type of the one or more moving reflectors.

In one embodiment, each trained machine learning model deployed for the on-device processing is optimized/tuned to make use of available hardware accelerated neural processing units (NPUs) and/or graphics processing units (GPU) of the electronic device 110, or to default to a CPU code implementation.

Figure 8:
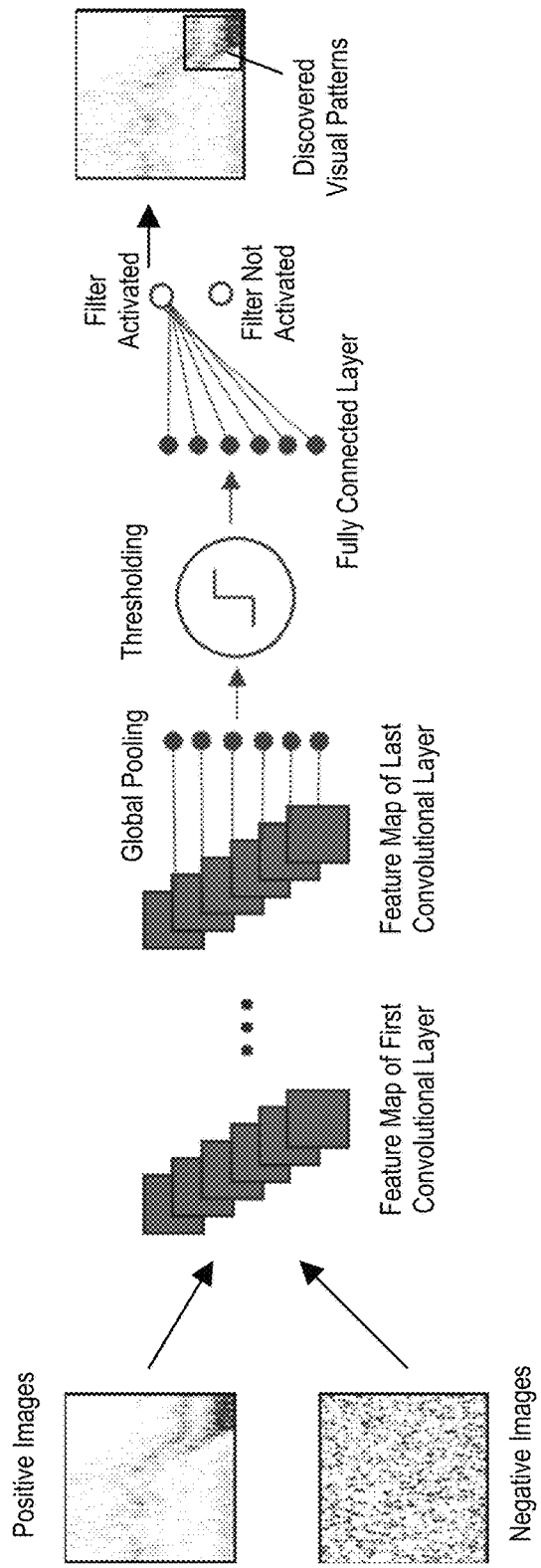
FIG. 8 illustrates an example machine learning model, in one or more embodiments.

FIG. 8 illustrates an example machine learning model 850, in one or more embodiments. In one embodiment, the machine learning model 850 is utilized by the machine learning distance, direction, and reflector type estimation system 740.

In one embodiment, output of DSP (e.g., detection signals from the DSP system 730) comprise SNR samples that are buffered and assembled to produce a two-dimensional matrix representing an echogram of a video signal. Each column of the matrix is a SNR vector of SNR samples of a pulse response. For example, if the echogram is a 256×256 image, at any given time the image represents echoes/reflections captured by the microphone of the audio system 720 for the last 256 consecutive pulse responses. The echogram includes information indicative of one or more moving reflectors, such as a position or distance, a direction of movement, and a unique echo footprint of each moving reflector.

In one embodiment, each SNR vector is a features vector that is annotated/labeled and used to train a machine learning model configured to classify the reflector type of the moving reflector according to its unique echo footprint (i.e., signature). The resulting trained machine learning model is optimized/tuned and deployed for on-device processing to estimate/predict a reflector type of a moving reflector present in the spatial area (e.g., an animal vs. a human user).

In one embodiment, the machine learning model 850 is a convolutional neural network (CNN) that is both representative (i.e., capable of detecting common visual patterns for the same reflector type) and discriminative (i.e., capable of detecting that a visual pattern for one reflector type is significantly different from visual patterns for other reflector types). For example, in one embodiment, the CNN is configured to receive, as inputs, echograms indicative of a particular reflector type (i.e., positive images) and echograms indicative of other reflector types (i.e., negative images).

In one embodiment, the CNN includes a plurality of convolutional layers (e.g., first convolutional layer, . . . , and last convolutional layer) configured to extract feature maps from inputs. The CNN further includes a global pooling layer, a thresholding layer, and a fully connected layer. The global pooling layer and the thresholding layer are between a last convolutional layer of the plurality of convolutional layers and the fully connected layer, and achieves shift-invariant property on finding common visual patterns for the particular reflector type. For example, a Kalman filter is activated if common visual patterns for the particular reflector type are discovered; otherwise, the filter is not activated.

Figure 9:
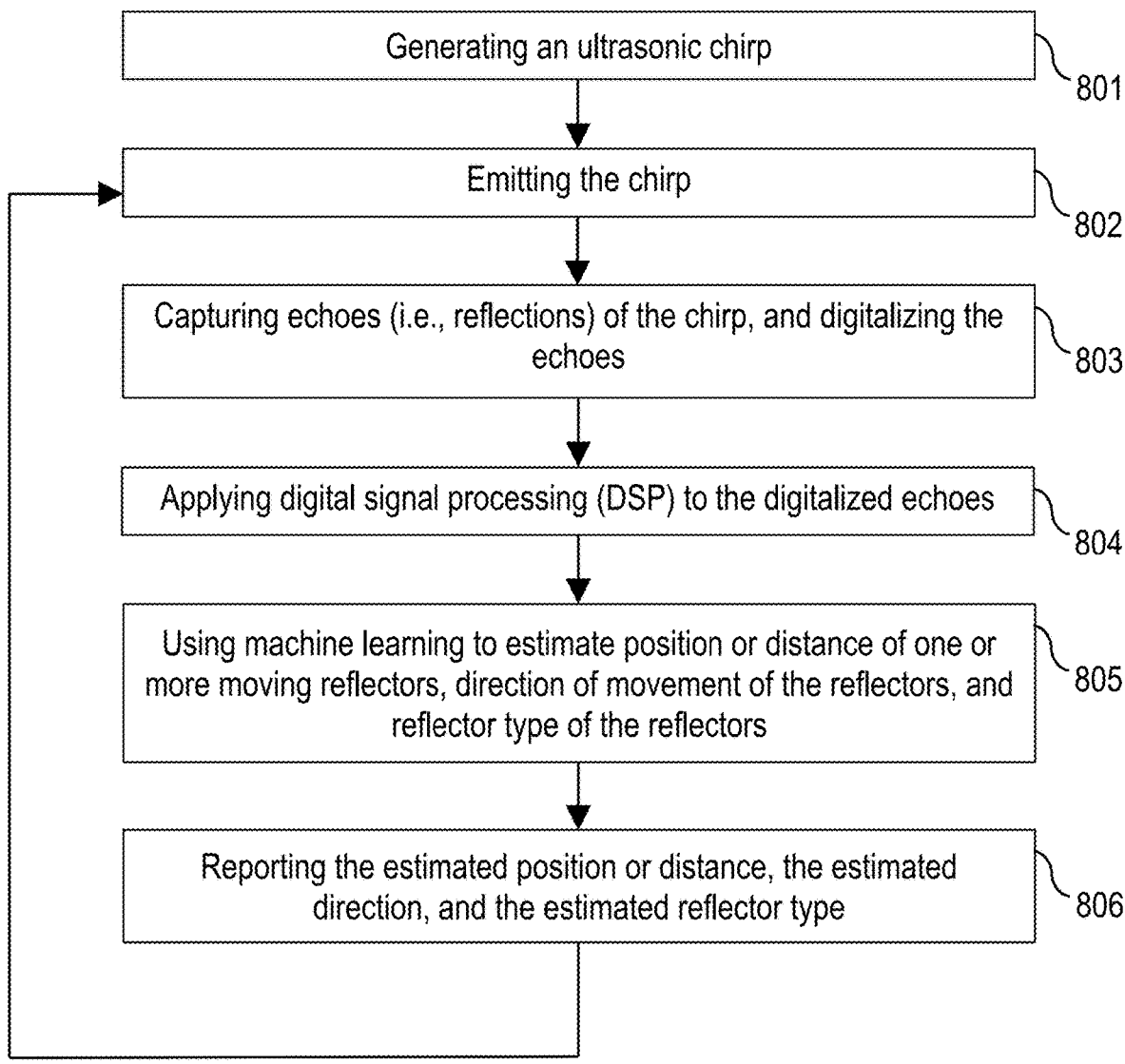
FIG. 9 is a flowchart of an example process for detecting user presence using machine learning and a single audio channel detector, in one or more embodiments.

FIG. 9 is a flowchart of an example process 800 for detecting user presence using machine learning and a single audio channel detector, in one or more embodiments. Process block 801 includes generating an ultrasonic chirp (e.g., via the signal generation system 710). Process block 802 includes initiating an iteration of an iterative loop by emitting the chirp (e.g., via the built-in-audio system 720). Process block 803 includes capturing echoes (i.e., reflections) of the chirp, and digitalizing the echoes (e.g., via the built-in-audio system 720). Process block 804 includes applying DSP to the digitalized echoes (e.g., via the DSP system 730). Process block 805 includes using machine learning to estimate position or distance of one or moving reflectors, direction of movement of the reflectors, and a reflector type of the reflectors (e.g., via the machine learning distance, direction, and reflector type estimation system 740). Process block 806 includes reporting the estimated position or distance, the estimated direction, and the estimated reflector type (e.g., via the machine learning distance, direction, and reflector type estimation system 740). After process block 806, the process 800 returns to process block 802 to initiate another iteration of the iterative loop.

In one embodiment, process blocks 801-806 may be performed by one or more components of the on-device user presence detection system 700.

Figure 10:
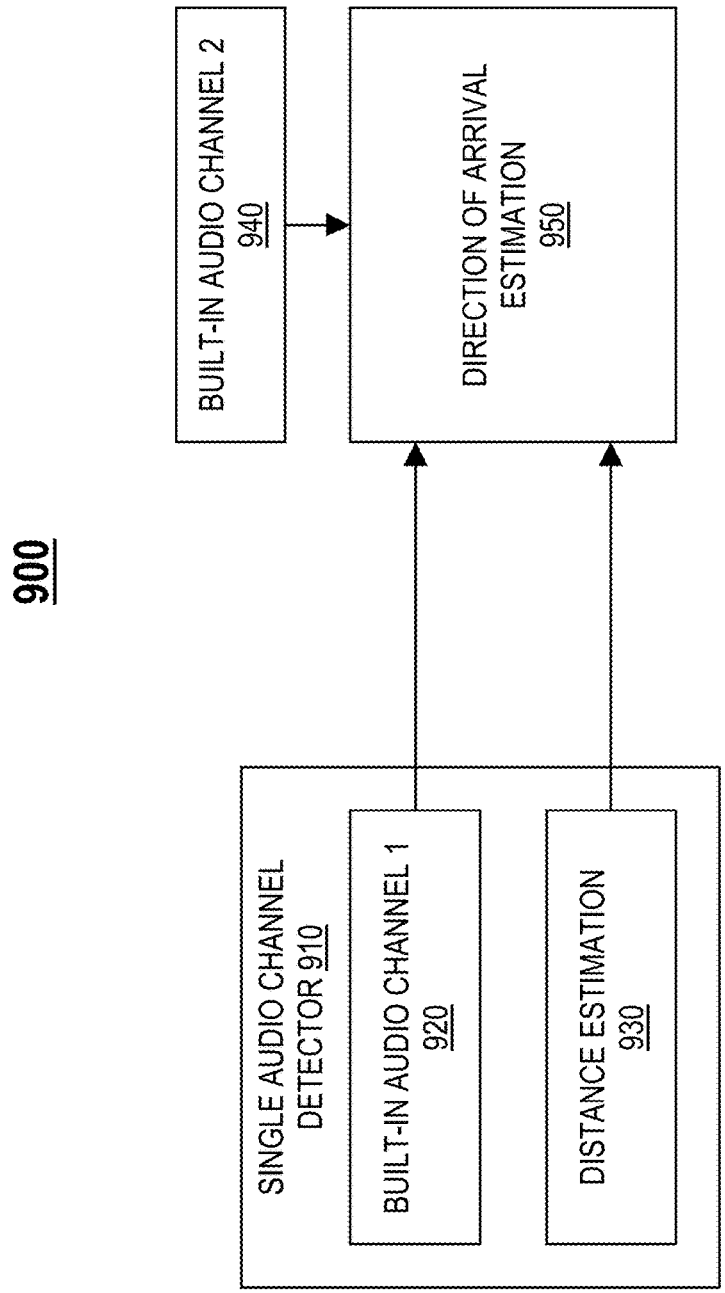
FIG. 10 illustrates an example on-device user presence detection system, in one or more embodiments.

FIG. 10 illustrates an example on-device user presence detection system 900, in one or more embodiments. In one embodiment, the user presence detection system 130 in FIG. 1 is implemented as the user presence detection system 900. In one embodiment, the electronic device 110 has multiple microphones 122 that the user presence detection system 900 utilizes to detect user presence by extrapolating direction of arrival (DOA) of a moving reflector.

For example, in one embodiment, a built-in audio system of the electronic device 110 includes a first microphone 122 (FIG. 1) that provides a first audio channel 920 (Channel 1) and a second microphone 122 (FIG. 1) that provides a second audio channel 940 (Channel 2). Utilizing multiple audio channels (i.e., the first and second audio channels 920, 940), the user presence detection system 900 operates as a multiple audio channels detector for user presence.

Both the first and second audio channels 920, 940 are aligned relative to a strongest echo (e.g., via a pulse alignment unit 432 of FIG. 3B). The user presence detection system 900 comprises a single audio channel detector 910 (e.g., user presence detection system 400 of FIG. 3A or user presence detection system 700 of FIG. 7) including a distance estimation system 930 (e.g., distance and direction estimation system 450 of FIG. 3A or machine learning distance, direction, and reflector type estimation system 740 of FIG. 7). The single audio channel detector 910 uses the first audio channel 920 to estimate, via the distance estimation system 930, a position or distance of a moving reflector.

The user presence detection system 900 comprises a distance of arrival estimation system 950 configured to: (1) receive raw audio for both the first and second audio channels 920, 940, and (2) apply a technique to determine an angle of arrival of the moving reflector based in part on the raw audio. In one embodiment, the technique applied depends on the number of available microphones 122 of the built-in audio system (e.g., 2), a topology of the microphones 122 (i.e., physical position of the microphones 122), and desired robustness. For each range bin, the user presence detection system 900 estimates a position or distance of the moving reflector, and uses the angle of arrival to produce a two-dimensional matrix representing an echogram. The matrix contains SNR values at relative coordinates (in a two-dimensional plane) to the electronic device 110.

In one embodiment, the electronic device 110 includes multiple microphones 122 (e.g., a microphone array) and multiple loudspeakers 121. The user presence detection system 900 estimates a position of one or more moving reflectors in a spatial area relative to the electronic device 110 in a two-dimensional plane by computing, for each of the multiple microphones 122, a relative delay of detection of the one or more moving reflectors.

Figure 11:
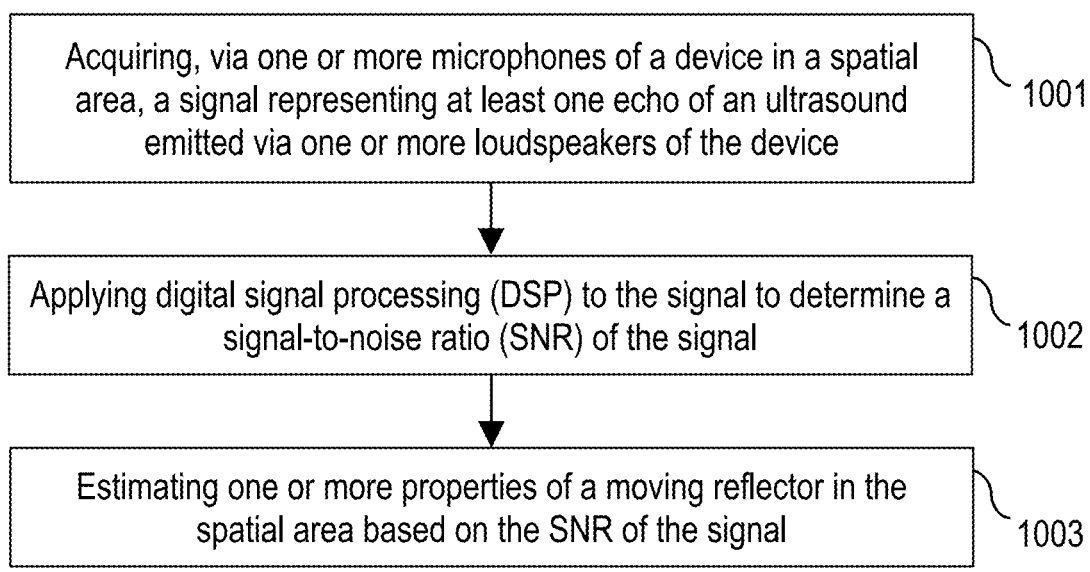
FIG. 11 is a flowchart of an example process for on-device user presence detection, in one or more embodiments.

FIG. 11 is a flowchart of an example process 1000 for on-device user presence detection, in one or more embodiments. Process block 1001 includes acquiring, via one or more microphones (e.g., microphones 122) of a device (e.g., electronic device 110) in a spatial area, a signal representing at least one echo of an ultrasound emitted via one or more loudspeakers (e.g., loudspeakers 121) of the device. Process block 1002 includes applying DSP to the signal to determine a SNR of the signal. Process block 1003 includes estimating one or more properties of a moving reflector in the spatial area based on the SNR of the signal.

In one embodiment, process blocks 1001-1003 may be performed by one or more components of the on-device user presence detection systems 130, 400, 700, and/or 900.

FIG. 12 is a high-level block diagram showing an information processing system comprising a computer system 1100 useful for implementing the disclosed embodiments. The systems 130, 400, 700, and 900 may be incorporated in the computer system 1100. The computer system 1100 includes one or more processors 1110, and can further include an electronic display device 1120 (for displaying video, graphics, text, and other data), a main memory 1130 (e.g., random access memory (RAM)), storage device 1140 (e.g., hard disk drive), removable storage device 1150 (e.g., removable storage drive, removable memory module, a magnetic tape drive, optical disk drive, computer readable medium having stored therein computer software and/or data), viewer interface device 1160 (e.g., keyboard, touch screen, keypad, pointing device), and a communication interface 1170 (e.g., modem, a network interface (such as an Ethernet card), a communications port, or a PCMCIA slot and card). The communication interface 1170 allows software and data to be transferred between the computer system and external devices. The system 1100 further includes a communications infrastructure 1180 (e.g., a communications bus, cross-over bar, or network) to which the aforementioned devices/modules 1110 through 1170 are connected.

Information transferred via communications interface 1170 may be in the form of signals such as electronic, electromagnetic, optical, or other signals capable of being received by communications interface 1170, via a communication link that carries signals and may be implemented using wire or cable, fiber optics, a phone line, a cellular phone link, a radio frequency (RF) link, and/or other communication channels. Computer program instructions representing the block diagram and/or flowcharts herein may be loaded onto a computer, programmable data processing apparatus, or processing devices to cause a series of operations performed thereon to generate a computer implemented process. In one embodiment, processing instructions for process 300 (FIG. 6), process 800 (FIG. 9), and process 1000 (FIG. 11) may be stored as program instructions on the memory 1130, storage device 1140, and/or the removable storage device 1150 for execution by the processor 1110.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the disclosed technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the disclosed technology.

Though the embodiments have been described with reference to certain versions thereof; however, other versions are possible. Therefore, the spirit and scope of the appended claims should not be limited to the description of the preferred versions contained herein.

What is claimed is:

1. A method comprising:
generating an ultrasound comprising a windowed chirp that is zero-padded, wherein the ultrasound completes a time period defined by $$\frac{1-D}{P},$$

D is a pre-determined pulse duty cycle, and P is a pre-determined pulse repetition frequency;
acquiring, via one or more microphones of a device in a spatial area, a signal representing at least one echo of the ultrasound emitted via one or more loudspeakers of the device;
applying digital signal processing to the signal to determine a signal-to-noise ratio (SNR) of the signal; and
estimating one or more properties of a moving reflector in the spatial area based on the SNR of the signal.

2. The method of claim 1, further comprising:
reporting the one or more properties of the moving reflector to an application executing on the device.

3. The method of claim 1, wherein the one or more properties of the moving reflector comprise at least one of a distance of the moving reflector relative to the device, a direction of movement of the moving reflector relative to the device, or a type of the moving reflector.

4. The method of claim 1, wherein the moving reflector is a human user.

5. The method of claim 1, wherein the ultrasound follows a multi-path propagation reflecting off at least one non-moving reflector before reflecting off the moving reflector.

6. The method of claim 1, further comprising:
producing a features vector based on the SNR of the signal;
labeling the features vector; and
training at least one machine learning (ML) model based on the features vector, wherein the at least one ML model is trained to estimate the one or more properties of the moving reflector in response to receiving an echo footprint of the moving reflector as an input.

7. The method of claim 1, further comprising:
determining a position of the moving reflector relative to the device in a two-dimensional plane by determining, for each of the one or more microphones, a relative delay of detection of the moving reflector.

8. A system comprising:
at least one processor; and
a non-transitory processor-readable memory device storing instructions that when executed by the at least one processor causes the at least one processor to perform operations including:
generating an ultrasound comprising a windowed chirp that is zero-padded, wherein the ultrasound completes a time period defined by 1−D/P, D is a pre-determined pulse duty cycle, and P is a pre-determined pulse repetition frequency;
acquiring, via one or more microphones of a device in a spatial area, a signal representing at least one echo of the ultrasound emitted via one or more loudspeakers of the device;
applying digital signal processing to the signal to determine a signal-to-noise ratio (SNR) of the signal; and
estimating one or more properties of a moving reflector in the spatial area based on the SNR of the signal.

9. The system of claim 8, wherein the operations further comprise:
reporting the one or more properties of the moving reflector to an application executing on the device.

10. The system of claim 8, wherein the one or more properties of the moving reflector comprise at least one of a distance of the moving reflector relative to the device, a direction of movement of the moving reflector relative to the device, or a type of the moving reflector.

11. The system of claim 8, wherein the moving reflector is a human user.

12. The system of claim 8, wherein the ultrasound follows a multi-path propagation reflecting off at least one non-moving reflector before reflecting off the moving reflector.

13. The system of claim 8, wherein the operations further comprise:
producing a features vector based on the SNR of the signal;
labeling the features vector; and
training at least one machine learning (ML) model based on the features vector, wherein the at least one ML model is trained to estimate the one or more properties of the moving reflector in response to receiving an echo footprint of the moving reflector as an input.

14. The system of claim 8, wherein the operations further comprise:
determining a position of the moving reflector relative to the device in a two-dimensional plane by determining, for each of the one or more microphones, a relative delay of detection of the moving reflector.

15. A non-transitory processor-readable medium that includes a program that when executed by a processor performs a method, the method comprising:
generating an ultrasound comprising a windowed chirp that is zero-padded, wherein the ultrasound completes a time period defined by 1−D/P, D is a pre-determined pulse duty cycle, and P is a pre-determined pulse repetition frequency;
acquiring, via one or more microphones of a device in a spatial area, a signal representing at least one echo of the ultrasound emitted via one or more loudspeakers of the device;
applying digital signal processing to the signal to determine a signal-to-noise ratio (SNR) of the signal; and
estimating one or more properties of a moving reflector in the spatial area based on the SNR of the signal.

16. The non-transitory processor-readable medium of claim 15, wherein the method further comprises:
reporting the one or more properties of the moving reflector to an application executing on the device.

17. The non-transitory processor-readable medium of claim 15, wherein the one or more properties of the moving reflector comprise at least one of a distance of the moving reflector relative to the device, a direction of movement of the moving reflector relative to the device, or a type of the moving reflector.

18. The non-transitory processor-readable medium of claim 15, wherein the moving reflector is a human user.

19. The non-transitory processor-readable medium of claim 15, wherein the ultrasound follows a multi-path propagation reflecting off at least one non-moving reflector before reflecting off the moving reflector.

20. The non-transitory processor-readable medium of claim 15, wherein the method further comprises:
producing a features vector based on the SNR of the signal;
labeling the features vector; and
training at least one machine learning (ML) model based on the features vector, wherein the at least one ML model is trained to estimate the one or more properties of the moving reflector in response to receiving an echo footprint of the moving reflector as an input.

* * * * *